Patented Sept. 12, 1939

2,173,069

UNITED STATES PATENT OFFICE 2,173,069

PROCESS OF PRODUCING QUATERNARY AMMONIUM BASES

Heinrich Ulrich and Ernst Ploetz, Ludwigshafen-on-the-Rhine, Germany, assignors to I. G. Farbenindustrie Aktiengesellschaft, Frankfort-on-the-Main, Germany No Drawing. Application September 24, 1937, Serial No. 165,488. In Germany September 26, 1934

7 Claims. (Cl. 260—247)

This application is a continuation-in-part of application Serial No. 40,410, filed on September 13, 1935, which has become abandoned.

The present invention relates to a new process of producing quaternary ammonium compounds.

It has already been proposed to prepare the corresponding quaternary ammonium bases by the action of ethylene oxide on a concentrated solution of trimethylamine. If tertiary amines which contain hydroxyalkyl radiclas are treated in a corresponding manner, quaternary ammonium bases are not obtained, but substances of the type of hydroxyalkyl ethers.

We have now found that quaternary ammonium compounds can also be prepared by causing tertiary amines containing at least one hydroxyalkyl group in the molecule to react with alkylene oxides while reducing the alkaline reaction of the reaction mixture nearly to the neutral point, at least at the commencement of the reaction. The process is preferably carried out at a hydrogen ion concentration of between pH=about 8 and about 9.6, the pH-value being less than 9, advantageously less than 8.5 at the commencement. In this manner the quaternary ammonium compounds are obtained in good yields. As initial materials may be mentioned on the one hand tertiary amines which contain one, two or three hydroxyalkyl groups, and on the other hand alkylene oxides, such as ethylene oxide or propylene oxide. The reaction is preferably carried out between 50° and 100° C. but somewhat lower or higher temperatures may also be employed.

The adjustment of the desired hydrogen ion concentration may be effected by complete or partial neutralization of the amine with organic acids, such as lactic acid, formic acid, acetic acid, butyric acid, or high molecular fatty acids for example those containing more than 6 carbon atoms in the molecule, such as stearic acid, or by partial neutralization with a strong inorganic acid, such as hydrochloric acid, sulphuric acid, phosphoric acid or nitric acid; acid salts of polybasic acids may also be used for adjusting the hydrogen ion concentration. The addition of these acid substances may take place before or during the reaction. The quaternary ammonium compounds obtained, in contrast to the corresponding substances of the type of hydroxyalkyl ethers, cannot be distilled in vacuo without decomposition. For example the quaternary ammonium compound obtainable from triethanol amine and ethylene oxide yields considerable amounts of ethylene glycol when distilled in vacuo. For the purpose of distinguishing and separating the quaternary ammonium compounds from the corresponding hydroxyalkyl ether-like substances (which may be formed in subordinate amounts as by-products) differences in solubility may also be employed; for example tetra-ethanol ammonium chloride dissolves readily in ethyl alcohol while the hydrochlorides of triethanol amine and of the hydroxyalkyl ether obtainable from triethanol amine and alkylene oxides are insoluble in ethyl alcohol. The quaternary ammonium compounds obtainable according to this invention are also soluble in 35 per cent caustic soda solution. They may be identified by their derivatives, for example tetraethanol ammonium hydroxide in the form of its benzoyl compound.

Tertiary amines which may be employed with advantage as initial materials are for example triethanol amine, methyl diethanol amine, ethyl diethanol amine, butyl diethanol amine, octodecyl diethanol amine, cyclohexyl diethanol amine, benzyl diethanol amine, diethyl ethanol amine, 1 - dimethyl-amino - 2-hydroxypropane, methyl octodecyl ethanol amine, methyl octodecenyl ethanol amine, N,N,N',N'-tetraethanol ethylene diamine, N,ethanol morpholine and N,ethanol decahydro quinoline.

The products according to the present invention are suitable as assistants for the textile and related industries, as for example as additions in cloth printing, and also as additions in the preparation of artificial threads for example in spinning baths and furthermore for the preparation of dyestuff pastes and powders.

The following examples will further illustrate the nature of this invention but the invention is not restricted to these examples. The parts are by weight.

Example 1

1000 parts of water are added to a soap obtained from 150 parts of triethanol amine and 280 parts of stearic acid. The hydrogen ion concentration of the resulting emulsion corresponds to a pH-value of from 8.0 to 8.2. 50 parts of ethylene oxide are led into the emulsion during the course of from two to three hours at from 50° to 60° C. The hydrogen ion concentration then corresponds to a pH-value of 8.4. The product formed dissolves in water giving a clear solution and has great foaming power.

By decomposition with concentrated caustic soda solution and filtration of the deposited sodium stearate, the tetra-ethanol ammonium hydroxide can be recovered. It may be identified by conversion into the benzoyl compound.

Example 2

150 parts of triethanol amine are stirred with a solution of 110 parts of 89 per cent phosphoric acid and 80 parts of caustic soda in 500 parts of water. The pH-value of the resulting mixture is 8.4. 50 parts of ethylene oxide are led in during the course of from two to three hours at room temperature. The pH-value of the mixture is then 8.8. Tetraethanol ammonium disodium phosphate is thus obtained. The free base may be isolated and identified in the manner described in Example 1.

Instead of the disodium phosphate, the monosodium phosphate may also be employed in the appropriate amount.

Example 3

50 parts of ethylene oxide are led at 60° C. during the course of from two to three hours into a solution of 150 parts of triethanol amine in 600 parts of 3 per cent hydrochloric acid. The pH-value of the solution employed, which is originally from 8.2 to 8.4, has risen to 9.2 after the action of the ethylene oxide. The reaction product is dehydrated, advantageously in vacuo, and then treated with ethyl alcohol and hydrogen chloride gas. There are obtained 73 per cent of tetra-ethanol ammonium chloride, which is soluble in ethyl alcohol, and 27 per cent of the hydrochloride of the hydroxyethyl ether of triethanol amine which is insoluble in ethyl alcohol.

Example 4

600 parts of triethanol amine are dissolved in about the same weight of water. After adding 150 parts of 24 per cent sulphuric acid, 50 parts of ethylene oxide are led in. As soon as the said amount of ethylene oxide has reacted, another 150 parts of 24 per cent sulphuric acid and 50 parts of ethylene oxide are added, the procedure being repeated until 600 parts of 24 per cent sulphuric acid and 200 parts of ethylene oxide have been used in all. The pH-value of the original solution to which the first portion of sulphuric acid has been added amounts to from 8.1 to 8.4. After leading in the ethylene oxide it rises to about 9.4.

The sulphuric acid is precipitated from the reaction mixture by means of barium hydroxide. After removing the precipitate, a solution of tetra-ethanol ammonium hydroxide is obtained which may readily be converted into an anhydrous form by evaporation in vacuo. If a sample of the anhydrous product be treated with alcohol and hydrogen chloride, there are obtained 83 per cent of tetra-ethanol ammonium chloride and 16 per cent of the hydrochloride of the monohydroxyethyl ether of triethanol amine.

Example 5

150 parts of triethanol amine are dissolved in 500 parts of water and 40 parts of glacial acetic acid are added. The pH-value of the resulting mixture is from 8.0 to 8.2. 50 parts of ethylene oxide are led in during the course of from two to three hours at from 50° to 60° C.

The quaternary ammonium compound formed may be identified by the benzoyl compound.

Example 6

322 parts of butyl diethanol amine are dissolved in 1500 parts of water and 200 parts of 24 per cent sulphuric acid are added. The pH-value of the mixture is then 8.4. 50 parts of ethylene oxide are then led in at from 50° to 60° C., the pH-value thus being increased to 9.2. Another 100 parts of 24 per cent sulphuric acid are added, the pH-value thus being reduced to 8.0. Another 50 parts of ethylene oxide are then led in and the pH-value raised thereby to 9.4. The sulphuric acid is removed from the resulting solution by precipitation with barium hydroxide, the precipitate filtered off and the solution evaporated. Butyl triethanol ammonium hydroxide is obtained in the form of a highly viscous liquid which is soluble in 35 per cent caustic soda solution.

Example 7

234 parts of diethyl monoethanol amine are dissolved in 480 parts of 12 per cent sulphuric acid. The pH-value of the solution is 8.4. 100 parts of ethylene oxide are led in, the pH-value thus being increased to 8.8. The solution is freed from sulphuric acid by precipitation with barium hydroxide and filtration and then yields by evaporation a semisolid mass which is readily soluble in 35 per cent caustic soda solution. The reaction product is diethyl diethanol ammonium hydroxide.

Example 8

133 parts of ethyl diethanol amine are dissolved in 500 parts of water and the pH-value is adjusted to about 8.0 by the addition of 50 parts of 65 per cent nitric acid. 45 parts of ethylene oxide are led at from 60° to 70° C. into the mixture. A clear colorless solution containing the quaternary ammonium compound formed is obtained in a good yield.

Example 9

245 parts of methyl dodecyl ethanol amine are mixed with 500 parts of water and 100 parts of 24.5 per cent sulphuric acid, whereby a solution with a pH-value of about 8 is obtained. 45 parts of ethylene oxide are led into the solution at from 60° to 70° C. A clear solution is obtained which is stable to alkali. 66 per cent of the amine employed are thus converted into quaternary ammonium compounds, namely in part into methyl dodecyl diethanol ammonium hydroxide and in part into the sulphate of the said base.

Example 10

43 parts of N,ethanol morpholine are mixed with 100 parts of water and 320 parts of 5 per cent sulphuric acid, a solution of the pH-value 8.4 being obtained. 15 parts of ethylene oxide are led into the solution at from 60° to 70° C. About 67 per cent of the N,ethanol morpholine employed are thus converted into diethanol morpholinium sulphate.

What we claim is:

1. The process of producing quaternary ammonium compounds, which comprises causing an alkylene oxide to react with a tertiary amine of the general formula

wherein R stands for a hydroxy lower alkyl group, and $R_2$ and $R_3$ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, in an aqueous medium the pH-value of which is between about 8 and about 9 at the beginning of the reaction.

2. The process of producing quaternary ammonium compounds, which comprises causing an alkylene oxide to react with a tertiary amine of the general formula

wherein R stands for a hydroxy lower alkyl group, and R₂ and R₃ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, in an aqueous medium the pH-value of which is between about 8 and about 9 at the beginning of the reaction, a pH-value between about 8 and about 9.6 being maintained during the reaction.

3. The process of producing quaternary ammonium compounds, which comprises causing an alkylene oxide to react with a tertiary amine of the general formula

wherein R stands for a hydroxy lower alkyl group, and R₂ and R₃ are selected from the class consisting of aliphatic hydrocarbon radicles, hydroxy lower alkyl, cyclo-alkyl and aralkyl groups, and alpihatic radicles which, together with the nitrogen atom, form a heterocyclic ring, in an aqueous medium the pH-value of which is less than 9 at the beginning of the reaction, a pH-value between about 8 and about 9.6 being maintained during the reaction.

4. The process of producing quaternary ammonium compounds, which comprises causing an alkylene oxide to react with a tertiary amine of the general formula

wherein R stands for a hydroxy lower alkyl group, and R₂ and R₃ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, at between 50° and 100° C, in an aqueous medium the pH-value of which is less than 9 at the beginning of the reaction, a pH-value between about 8 and about 9.6 being maintained during the reaction.

5. The process of producing quaternary ammonium compounds, which comprises causing an alkylene oxide to react with a tertiary amine of the general formula

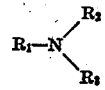

wherein R stands for a hydroxy lower alkyl group, and R₂ and R₃ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, in an aqueous medium the pH-value of which is adjusted by the addition of an acid to between about 8 and about 9 at the beginning of the reaction.

6. The process of producing quaternary ammonium compounds, which comprises causing an alkylene oxide to react with a tertiary amine of the general formula

wherein R stands for a hydroxy lower alkyl group, and R₂ and R₃ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, in an aqueous medium the pH-value of which is adjusted by the addition of a strong mineral acid to between about 8 and about 9 at the beginning of the reaction.

7. The process of producing quaternary ammonium compounds, which comprises causing an alkylene oxide to react with a tertiary amine of the general formula

wherein R stands for a hydroxy lower alkyl group, and R₂ and R₃ are selected from the class consisting of aliphatic hydrocarbon radicles, hydroxy lower alkyl, cyclo-alkyl and aralkyl groups, and aliphatic radicles which, together with the nitrogen atom, form a heterocyclic ring, in an aqueous medium the pH-value of which is adjusted by the addition of a high molecular weight fatty acid to between about 8 and about 9 at the beginning of the reaction.

HEINRICH ULRICH.
ERNST PLOETZ.